No. 780,159. PATENTED JAN. 17, 1905.
W. H. CORBETT.
CLUTCH MECHANISM.
APPLICATION FILED MAR. 17, 1904.
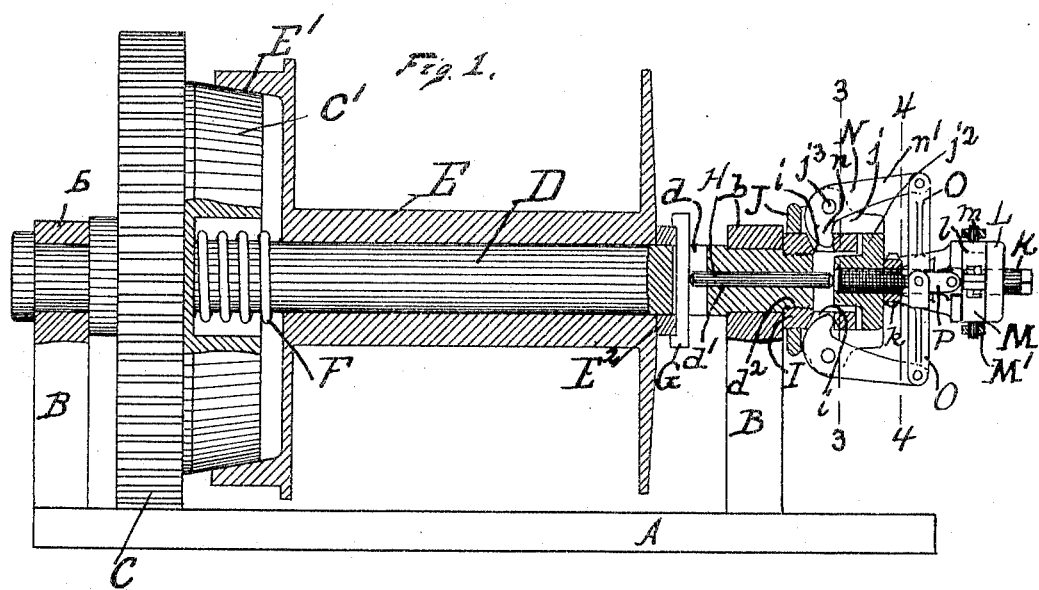
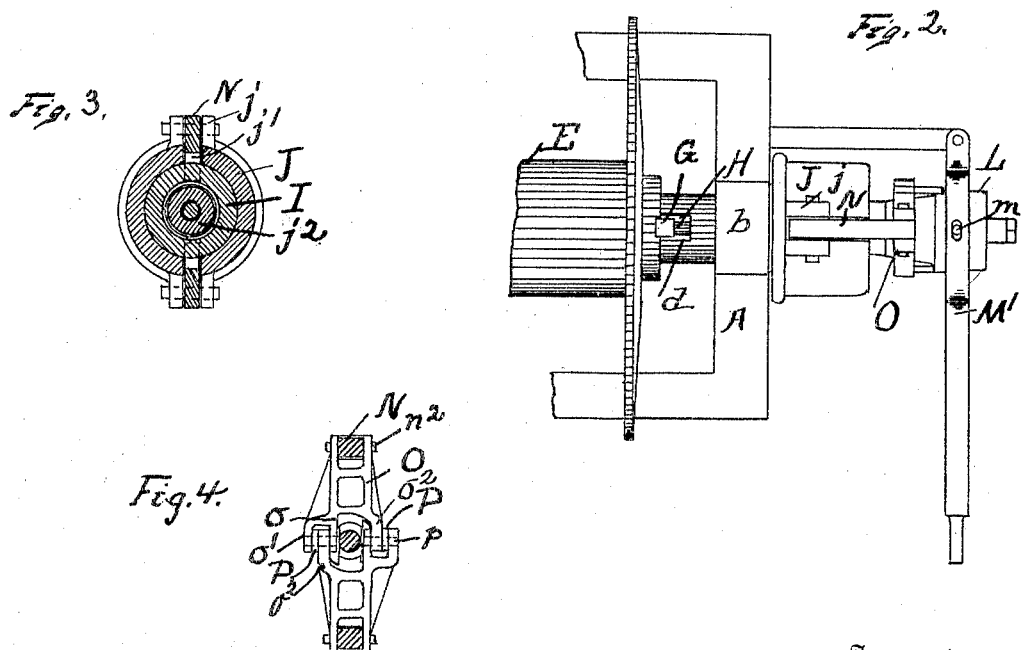
Witnesses
W. E. Cadwell
M. C. Sullivan
Inventor
William H. Corbett
by N. R. Lisk
Attorney No. 780,159.　　　　　　　　　　　　　　　　　　　　　　　Patented January 17, 1905.

UNITED STATES PATENT OFFICE.

WILLIAM HARRISON CORBETT, OF PORTLAND, OREGON.

CLUTCH MECHANISM.

SPECIFICATION forming part of Letters Patent No. 780,159, dated January 17, 1905.

Application filed March 17, 1904. Serial No. 198,656.

*To all whom it may concern:*

Be it known that I, WILLIAM HARRISON CORBETT, a citizen of the United States, residing at Portland, in the county of Multnomah and State of Oregon, have invented new and useful Improvements in Clutch Mechanisms, of which the following is a specification.

This invention relates to clutch mechanisms; and it consists in certain improvements in the construction thereof, as will be hereinafter fully described, and pointed out in the claims.

More particularly the invention relates to clutch mechanisms for hoisting or logging machines, and in the accompanying drawings it is shown in combination in a hoisting or logging machine.

The invention is illustrated in the accompanying drawings, as follows:

Figure 1 is an elevation of a hoisting device, partly in section, to better show construction. Fig. 2 is a plan view of the clutch-operating end of the device. Fig. 3 is a section on the line 3 3 in Fig. 1 looking toward the left. Fig. 4 is a section on the line 4 4 in Fig. 1 looking toward the right.

A marks the base of the machine; B, the posts extending upwardly from the base. The upper ends of the posts are provided with the usual bearings $b\ b$, in which is journaled the shaft D. The shaft is driven by the gear C. Mounted upon the shaft is the drum E. The gear C has the cone-surface C' fixed to rotate with it, and the drum E has the friction-surface E', which is adapted to be brought into engagement with the surface C' for setting the clutch. A spring F holds the clutch-surface E' normally out of engagement with the surface C'. A collar $E^2$ is arranged on the shaft against the end of the drum E, and the key G is arranged in the slot $d$ in the shaft and against the collar $E^2$. A pin H extends through an opening $d'$ in the shaft and is arranged against the key G. The structure so far as described is in common use, and its operation will be readily understood. When pressure is exerted upon the thrust-pin H, it is communicated through the key G, collar $E^2$, drum E, so as to bring the surface E' into engagement with the surface C' and set the clutch. When this pressure is relieved, the spring F throws the surface E' out of engagement.

It is desirable to have the drum come as near the bearings as possible, so that the shaft D may be made as light as possible. It is also desirable to relieve the bearings of any thrust—in other words, to have it self-sustained, so far as the shaft is concerned, so that the clutch may be maintained in engagement without exerting any thrust on the bearings. It is also desirable that such mechanism be provided whereby the clutch may be thrown into and out of engagement while the parts are in motion. These things have been accomplished heretofore by means of specially-designed thrust devices which are more or less cumbersome and expensive, as well as being subject to severe wear. By the present invention a mechanism has been devised by which a simple lever construction is utilized on this class of clutch and accomplishes all the desirable purposes heretofore mentioned.

In order that the device may be readily attached to existing mechanisms, I provide the shaft D with an extension I. This is secured to the screw-thread $d^2$ on the end of the shaft and is in the form of a sleeve. Slidingly mounted on this extension is the thrust-frame J. This thrust-frame J has a slot $j'$, at the sides of which are the projections $j$. The end of the frame is provided with a thrust-flange $j^2$, into which is screwed a rod K, the end of the rod abutting against the thrust-pin H. The outer end of the rod has a smooth surface forming a means of support for the clutch-actuating mechanism. Bell-crank levers N are pivoted on the pin $j^3$, extending between the projections $j$. One arm $n$ of the bell-crank lever extends into an opening $i$ in the extension I and is fulcrumed against the walls of this opening, or, in other words, said arms are, so far as the thrust is concerned, fulcrumed on the shaft, the shaft extension being virtually a part of the shaft. The opposite end $n'$ of the bell-crank lever extends out over the rod K. As before stated, the rod K is screw-threaded, so that it may be screwed into or out of the flange $j^2$. By this means any wear may be taken up and the thrust mechanism adjusted. The screw is locked in any adjusted position by the jam-nut $k$. Mounted on the smooth part of the shaft K is a sliding block L. A collar M is locked on this sliding block against axial movement, but is free to move rotatively. As arranged, it is in the groove shown by the dotted line I. The pin $m$ extends from this collar, and the operating-lever M' engages these pins. The sliding block L may be moved in and out by the lever M' to set or disengage the clutch. The radially-acting levers O are pivoted, by means of the pin $n^2$, on the arms $n'$ of the levers N. These levers have the throated ends $o$, which extend at each side of the sliding block L and the rod K. At one side of the throat $o$ are forks $o'$. The single end $o^2$ of the throat $o$ is placed between the arms of the forks $o'$, one being at each side. The levers are interchangeable, as clearly shown in Fig. 4. Links P are also arranged between the ends of the forks $o'$, and the whole is assembled—that is, the links and the ends of the arms—by the pins $p$. The links P are also pivotally secured to the sliding block L. The inner end of the sliding block is so proportioned that the radial levers O are carried just beyond the point bringing the pivots between said levers and their pivotal connection with the arms of the bell-cranks in line, so that when the sliding block L is moved inwardly into contact with the nut $k$ the clutch mechanism remains set by reason of this fact. By connecting the radial levers O a toggle-joint is formed, and by operating this with the link connection formed by the link P the rod K is relieved entirely of any radial thrust incident to any inequalities in the levers or fulcrums, so that the sliding block will move freely upon said rod, and the rod may be made quite light without danger of being bent.

What I claim as new is—

1. In a clutch mechanism the combination of the clutch members; a shaft on which said members are mounted; bearings for the shaft; said clutch members being mounted on said shaft between said bearings; a clutch-actuating mechanism mounted on said shaft outside of said bearings comprising bell-crank-shaped thrust-levers fulcrumed on the shaft; devices for communicating the action of the thrust mechanism to the clutch; and radially-acting levers for actuating said thrust-levers.

2. In a clutch the combination of the clutch members; a shaft on which said members are mounted; bearings for the shaft; said clutch members being mounted on said shaft between said bearings; a clutch-actuating mechanism mounted on said shaft outside of said bearings comprising a sliding thrust-frame; bell-crank-shaped thrust-levers mounted on said frame and fulcrumed on the shaft; radially-acting levers for actuating said thrust-levers; and devices for communicating the action of the thrust-frame to the clutch.

3. In a clutch mechanism the combination of the clutch members; a shaft on which said members are mounted; bearings for the shaft; said clutch members being mounted on said shaft between said bearings; a clutch-actuating mechanism mounted on the shaft outside of said bearings comprising the sliding frame J, having the slots $j''$ and projections $j$ thereon; the bell-crank levers N pivoted between said projections having the arm $n$ fulcrumed on the shaft and the arm $n'$ extending axially; devices communicating the action of the frame J to the clutch; and mechanism for actuating the levers N.

4. In a clutch mechanism, the combination of the clutch members; a shaft on which said members are mounted; bearings for the shaft; said clutch members being mounted on said shaft between said bearings a clutch-actuating mechanism mounted on said shaft outside of said bearings, comprising bell-crank-shaped levers fulcrumed on the shaft; means for communicating the thrust from the clutch-actuating mechanism to the clutch; and means for adjusting said devices to take up the wear; and radially-acting levers for actuating said levers.

5. In a clutch mechanism the combination of the clutch members; a shaft on which they are mounted; a clutch-actuating mechanism comprising a supporting-rod; a sliding member mounted on said rod; radial levers throated to extend around said rod and arranged to form a toggle-joint, the throats of said levers having the forks at one side, the arms of which are arranged to make the levers interchangeable; and links connecting the levers with the sliding member, said links being pivoted on the levers between the arms of the forks.

6. In a clutch mechanism the combination of the clutch members; a shaft on which they are mounted; bearings for said shaft; said clutch members being mounted on said shaft between said bearings; a clutch-actuating mcheanism arranged outside of said bearings; a thrust-pin extending in the shaft through the bearings and arranged to communicate the action of the clutch-actuating mechanism to the clutch; a sliding thrust-frame; a screw arranged in said thrust-frame for adjusting the clutch, said screw having an extension forming a support for a sliding block; said sliding block and devices controlled by the sliding block for operating the clutch-actuating mechanism.

7. In a clutch mechanism the combination of the clutch members C' and E'; the shaft D; bearings for said shaft at each side of the clutch members; the thrust-pin H for actuating the clutch from without the bearings; the extension I removably secured to the end of the shaft having the openings $i$; the sliding thrust-frame J mounted on said extension and said extension having the slot $j'$ and projection $j$; the bell-crank levers N pivoted between said projections, one arm of the bell-crank extending into the opening $i$, and being fulcrumed against the wall thereof, and the opposite end of the bell-crank extending axially; the flange $j^2$ on the sliding frame; the rod K having the screw end secured into the flange $j^2$ against the thrust-pin H; the sliding block L on said rod; the radial levers O forming a toggle-joint and being connected with the ends of the levers N; and the links P connecting the block with said radial levers.

In testimony whereof I have hereunto set my hand in the presence of two subscribing witnesses.

WILLIAM HARRISON CORBETT.

Witnesses:
GEORGE TAZWELL,
C. A. DOLPH.